Figure 1A:
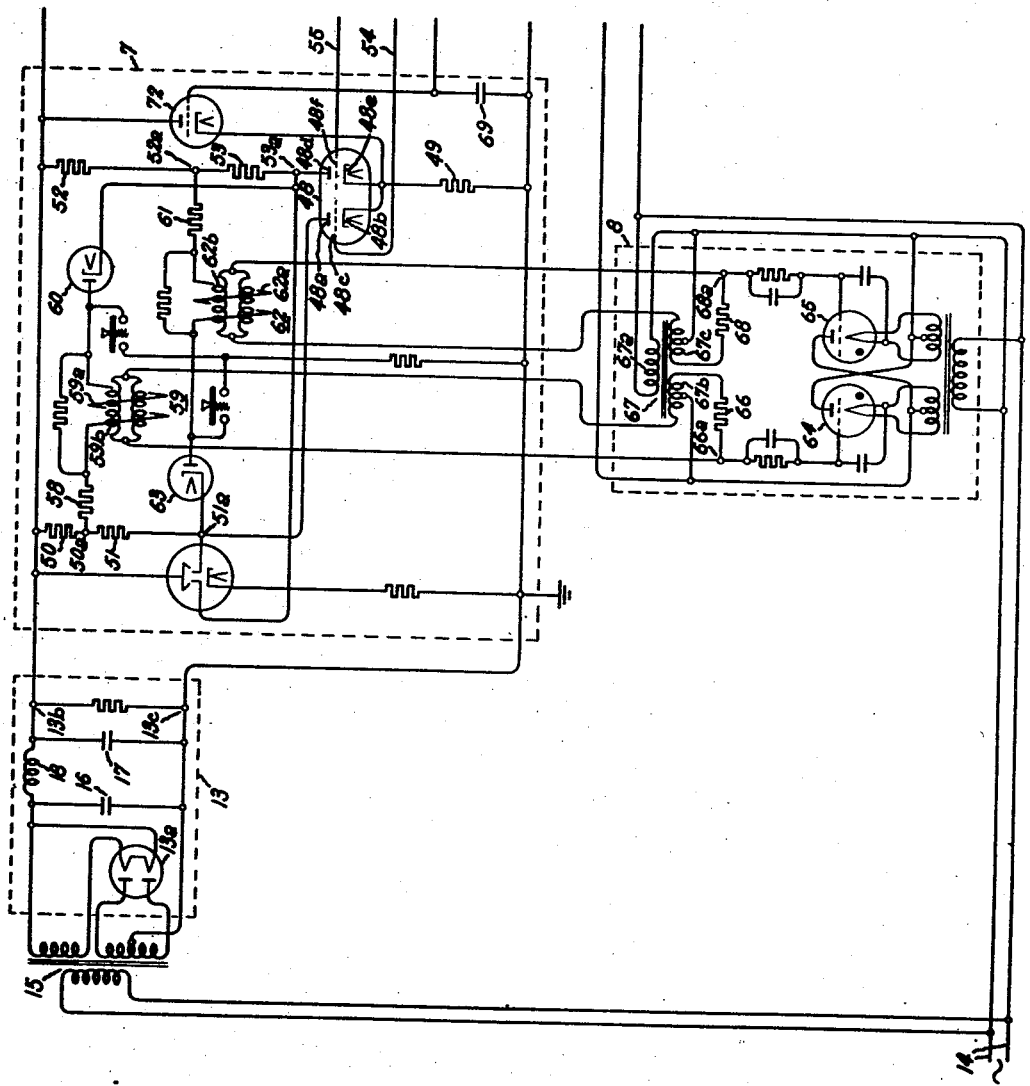

Inventor:
Leroy U. C. Kelling,
His Attorney.

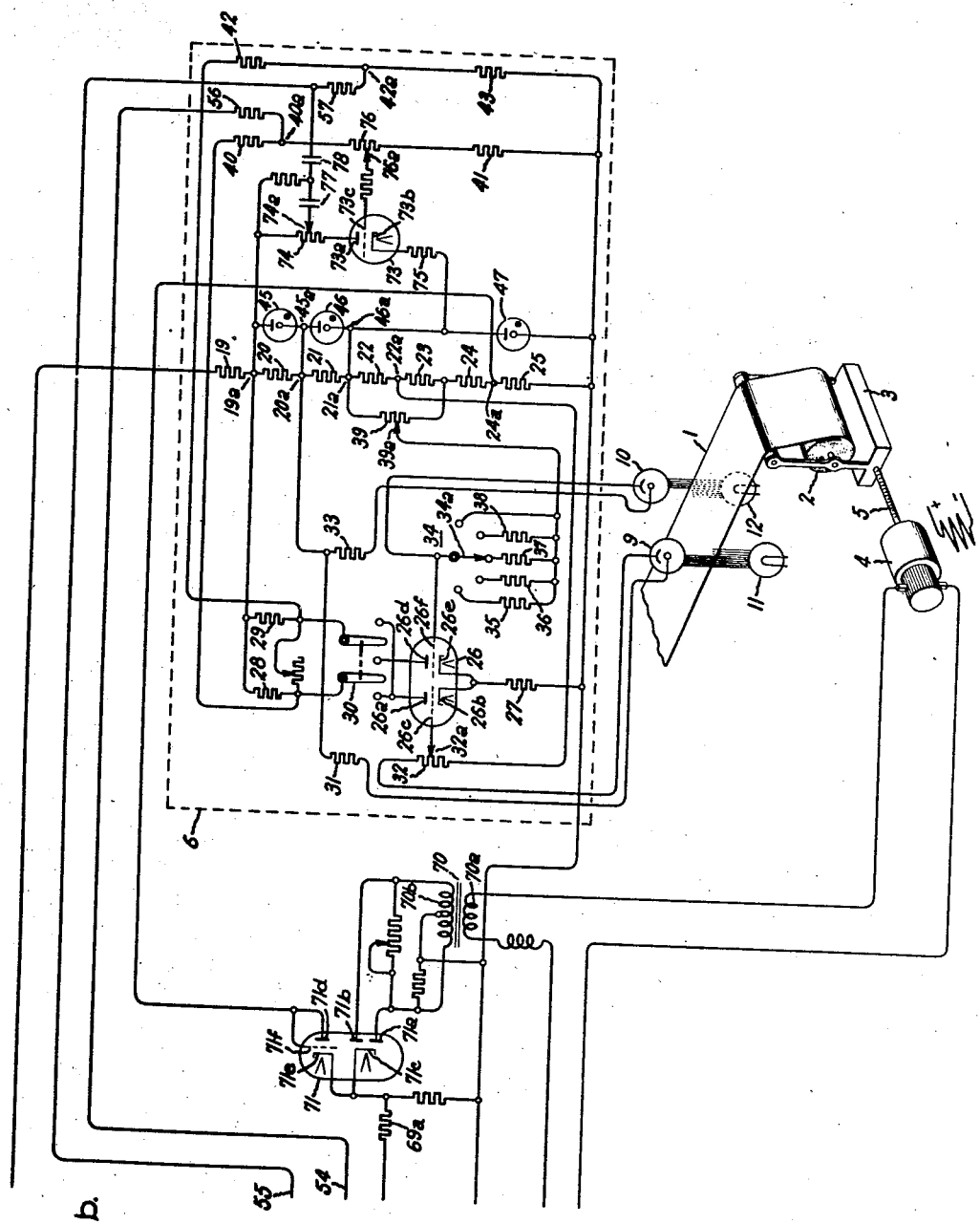

Patented June 29, 1948

2,444,261

UNITED STATES PATENT OFFICE 2,444,261

CONTROL SYSTEM

Leroy U. C. Kelling, Schenectady, N. Y., assignor to General Electric Company, a corporation of New York Application February 21, 1947, Serial No. 730,132

11 Claims. (Cl. 250—27)

This invention relates to control systems, more particularly to electronic control systems for controlling the operations of electrical translating devices, and it has for an object the provision of a simple, reliable and improved control system of this character.

Still more specifically the invention relates to electronic control systems in which a signal voltage is energized and utilized to control the operation of a dynamoelectric machine such, for example, as a generator or an electric motor.

In carrying the invention into effect in one form thereof, a signal voltage is derived from a device such as a potentiometer, photoelectric cell or any other suitable means. It is supplied to the control grids of an electric valve type amplifier which comprises a pair of electric valves of which the cathodes are connected through a common resistor to one side of a source of voltage. The anodes, one the other hand, are separately connected to the other side of the source. A bridge circuit is connected in the anode circuits. It comprises a separate impedance connected between each anode and the opposite side of the source, i. e. the side to which the cathode is not connected. In the balanced condition, both valves conduct equal amounts of current and each valve conducts an amount which is approximately half its maximum rating. These currents produce voltage drops across the anode impedances. A first control circuit is connected from a point on one anode resistor to a point of relatively lower voltage on the second anode impedance. Similarly, a second control circuit is connected from a point on the second anode impedance to a point of relatively lower voltage on the first anode impedance. In the balanced condition, equal currents flow in these control circuits. These currents are relatively small in comparison with the currents which flow in the anode circuits. Variation of the signal voltage which is supplied to the input or grid circuits upsets the balance, and the resulting difference in energization of the two control circuits is utilized to control an electrical translating device.

Another aspect of the invention relates to the limiting of a terminal electrical characteristic of the translating device such as its current, voltage, power, etc. A signal voltage which is derived from the characteristic which is to be limited is utilized to charge a capacitor and the voltage of this capacitor is applied to the grid of a control valve which in turn controls the amplifier valves to limit the characteristic.

In illustrating the invention in one form thereof it is illustrated as embodied in a photoelectrically actuated position control system. The invention may of course be used in other applications.

For a better and more complete understanding of the invention, reference should now be had to the following specification and to the accompanying drawing of which Figs. 1A and 1B taken together constitute a simple, diagrammatical sketch of an embodiment of the invention.

Referring now to the drawing, a length of material 1 such as a web of paper or a strip of steel is being unwound from a reel 2. The reel is held back by any suitable braking means to maintain the proper tension.

The reel is mounted on a carriage 3 which is slidably mounted in ways (not shown) to provide for movement of the carriage at right angles to the length of material. Suitable means such as an electric motor 4 and a screw 5 driven thereby are provided for moving the carriage along the ways in either direction depending upon the direction of rotation of the motor.

It is desired to maintain the length of material 1 in a predetermined position laterally, e. g. centered with respect to its edges, and in order to accomplish this, suitable light-sensitive means such as a photoelectric scanning head is provided for detecting any deviation of the length of material from a central position and producing a signal voltage corresponding to such deviation. This signal voltage is amplified by suitable electronic apparatus comprising first and second stage electric valve amplifiers 6 and 7. An electric power valve apparatus 8 controlled by the second stage amplifier controls the energization of the motor 4.

The scanning head is illustrated as comprising a pair of light-sensitive devices such as photoelectric cells 9 and 10 and light sources such as lamps 11 and 12. The lamp 11 directs a beam of light toward the cell 9 and, likewise, the lamp 12 directs a beam of light toward the cell 10. Initially the photoelectric cells and the lamps are so positioned that when the length of material is centered in the desired position laterally it interrupts approximately half the light beams which are directed from the lamps toward the photoelectric cells.

The first stage amplifier 6 is supplied from a suitable source of direct voltage which in the illustrated embodiment comprises a full wave rectifier 13 which in turn is supplied from a suitable source of alternating voltage 14 to which it is connected by means of a supply transformer 15. Both halves of the alternating voltage wave are rectified by a suitable full wave rectifying valve 13a. This rectified voltage is filtered by suitable means illustrated as comprising capacitors 16 and 17 and an inductance 18. The filtered direct voltage appears across the output terminals 13b and 13c. As shown, the negative output terminal 13c is connected to ground.

A voltage divider comprising resistors 19, 20, 21, 22, 23, 24 and 25 is connected across output terminals 13b and 13c of the rectifier. A twin triode electric valve 26 is supplied with direct voltage derived from a portion of the voltage divider. This valve has two conducting paths within a common envelope of which the first comprises the anode 26a and the cathode 26b with a control grid 26c interposed between them. The second path of the valve comprises the anode 26d, the cathode 26e and a control grid 26f. Both cathodes 26b and 26e are connected through a common resistor 27 to the negative terminal 13c. The anodes 26a and 26d, on the other hand, are separately connected through resistors 28 and 29 to a point 19a of positive voltage on the voltage divider. A direction of correction switch 30 is included in the anode circuits.

Each grid circuit of the valve 26 includes a different one of the photoelectric cells 9 and 10. As shown, the circuit for the grid 26c is traced from the point 20a of positive voltage on the voltage divider through resistor 31, photoelectric cell 9, potentiometer 32, to the intermediate point 22a on the voltage divider. The grid 26c is connected to the slider 32a of the potentiometer. Similarly, the circuit of the grid 26f is connected from the point 20a on the voltage divider through the resistor 33, photoelectric cell 10, to the slider 34a of a tap switch, through a selected one of the loading resistors 35, 36, 37 and 38 to the slider 39a of a potentiometer 39 which is connected across the resistor sections 22 and 23 of the voltage divider. The grid 26f is directly connected to the slider 34a of the tap switch 34.

When no light is falling upon the photoelectric cells 9 and 10 the currents in both paths of the valve 26 are balanced by adjustment of the potentiometer 39 and the initial adjustment is such that both paths of the valve are conducting approximately in mid range. Also, the currents in both paths of the valve are balanced for the normal operating condition, i. e. the condition in which beams of light from the lamps 11 and 12 are falling on the photoelectric cells 9 and 10 and the length of material 1 is centered in the desired position. This is accomplished by adjustment of the tap switch 34 to select one of the grid circuit load resistors 35, 36, 37 and 38 and adjustment of the potentiometer 32 until the desired balance is obtained.

With current flowing in both conducting paths of the valve, corresponding voltage drops appear across the resistors 28 and 29. The voltage between the anode 26a and the negative terminal 13c is divided by means of a divider which comprises resistors 40, 41 and potentiometer 76. Similarly, the voltage between the anode 26d and the negative terminal 13c is divided by means of two resistors 42 and 43. In the balanced condition, the voltages at the points 40a and 42a of these dividers are equal.

A plurality of voltage regulating valves 45, 46 and 47 are connected in series relationship between the point 19a and the negative terminal 13c. The point 20a of the voltage divider is connected to the junction point 45a of the valves 45 and 46, and similarly the point 21a of the voltage divider is connected to the junction point 46a between the valves 46 and 47. Thus, the voltages at the points 19a, 20a, 21a and 13c are stabilized by means of the regulator valves and remain substantially constant for wide variations in current flowing at these points.

As shown, the second stage amplifier 7 is also supplied with direct voltage from the output terminals 13b and 13c of the rectifier. This amplifier, like the first stage amplifier, comprises a twin triode electric valve 48 having two conducting paths within the same envelope. The left-hand conducting path comprises the anode 48a and a cathode 48b with a control grid 48c interposed between them and similarly the right-hand conducting path comprises the anode 48d, the cathode 48e and the interposed control grid 48f. Both cathodes 48b and 48e are connected through a common resistor 49 to the negative terminal 13c. A bridge circuit network is connected in the anode circuits of the valve. In the circuit of the anode 48a are connected two resistors 50 and 51 and similarly in the circuit of anode 48d are connected two resistors 52 and 53. The grids 48c and 48f are connected by means of conductors 54 and 55 through resistors 56 and 57 to the points 40a and 42a on the anode circuit voltage dividers of the first stage amplifier.

As stated in the foregoing, in the balanced condition, i. e. when equal amounts of light fall on the photoelectric cells 9 and 10, the voltages of the points 40a and 42a are equal and these equal voltages are applied to the grids 48c and 48f of the second amplifier. The initial adjustments are such that in this balanced condition both paths of the valve 48 are conducting in mid range and the currents are equal. As a result of these anode currents, voltage drops appear across the resistors 50 and 51 and across the resistors 52 and 53. Consequently, the voltage of the junction point 50a of the resistors 50 and 51 is relatively higher than the voltage of the point 53a which is connected to the anode 48b. Also, the voltage of the junction point 52a of resistors 52 and 53 is higher than the voltage of the point 51a which is connected to the anode 48a.

A control circuit comprising a resistor 58, the saturating winding 59a of a saturable reactor 59 and a diode electric valve 60 is connected between points 50a and 53a. A similar circuit which comprises a resistor 61, saturating winding 62a of a saturable reactor 62 and a diode valve 63 are connected between points 52a and 51a. The diode 60 is poled to permit current to flow from the point 50a to the point 53a but not in the reverse direction. Similarly, the diode valve 63 is poled to permit current to flow from the point 52a to the point 51a but not in the reverse direction.

The ohmic resistances of resistors 51 and 53 are of relatively low value and consequently the voltage drops across these resistors are relatively small with the result that, at balance the currents flowing in the saturating windings 59a and 62a are correspondingly small. Thus, in the balanced condition equal minimum currents flow in these saturating windings 59a and 62a. When the signal voltages which are supplied to the first stage amplifier depart from the balanced condition, the current flowing in one of the saturating windings will increase and that flowing through the other will decrease.

Current is supplied to the armature of the correction motor 4 from the electric power valve apparatus 8. This electric power valve apparatus is illustrated as comprising two thyratrons 64 and 65 which are reversely connected in parallel between one terminal of the armature and one side of the A.-C. source which is preferably the same source as that from which the transformer 15 is supplied. The opposite terminal of the armature is connected to the opposite side of the source. Since the thyratrons 64 and 65 are reversely connected in parallel, both halves of the alternating voltage waves may be rectified. Although the magnitude of the current conducted by the thyratrons 64 and 65 may be controlled by any suitable means, it is preferred to use the method of varying the firing point of each thyratron in the positive half cycles of its anode voltage. This is accomplished by supplying alternating voltages to the grids and providing separate resistance-reactance circuits for shifting the phase of the alternating grid voltage of each thyratron with respect to its anode voltage. The phase shifting circuit for the thyratron 64 comprises the reactance winding 59b, the resistance 66, and the secondary winding 67b of a transformer 67. A similar phase shifting circuit for the thyratron 65 is provided which comprises the reactance winding 62b of the reactor 62, the resistor 68, and another secondary winding 67c of the transformer 67.

The transformer 67 is provided with a primary winding 67a which is connected to the alternating voltage source 14 to which the output circuits of the thyratrons 64 and 65 are connected. Thus, the voltages induced in the secondary windings 67b and 67c have predetermined phase relationships with respect to the anode voltages of the thyratrons.

The cathode of the thyratron 64 is connected to the mid point of the secondary winding 67b and the control grid is connected to the common point 66a of the resistor 66 and the reactance winding 59b. Similarly, the cathode of thyratron 65 is connected to the mid point of the secondary winding 67c and the control grid is connected to the junction point of the resistor 68 and the reactance winding 62b. Thus, the alternating voltage between the mid point of the secondary winding 67b and the point 66a is applied to the input circuit of thyratron 64 and similarly the alternating voltage which appears between the mid point of the secondary winding 67c and the point 68a is applied to the input circuit of the thyratron 65.

In the balanced condition in which the length of material is properly centered and equal minimum currents flow in the saturating windings 59a and 62a, the inductive reactances of the reactance windings are near maximum and substantially equal. Consequently, the voltages supplied through the input circuits of the thyratrons lag the anode voltages by relatively large angles. The result is that each thyratron conducts during a relatively small portion of the positive half cycles of its anode voltage and supplies a relatively small average current to the motor armature. Since the thyratrons are reversely connected in parallel they supply currents in opposite directions to the armature. In the balanced condition, these currents are equal with the result that the net D.-C. component supplied to the armature is zero and the motor is at standstill.

For the purpose of limiting the armature current to a proper value, suitable means are provided which comprise a capacitor 69, a current transformer 70 having a primary winding 70a and a secondary winding 70b, an electric valve 71 and a second electric valve 72. The primary winding 70a of the transformer is connected in the armature circuit of the motor 4. Since the current which the thyratrons supply to the armature circuit is pulsating in character, an alternating voltage is reduced in the secondary winding 70b.

Although the electric valve 71 may be of any suitable type, it is illustrated as having two anodes 71a and 71b, a cathode 71c, an anode 71d, a cathode 71e and a control grid 71f. The two anodes 71a and 71b are connected to opposite terminals of the secondary winding 70b and the capacitor 69 is connected through a resistor 69a between the cathode 71c and the mid point of the secondary winding 70b. Thus, the anodes 71a and 71b and the cathode 71c function as a biphase half wave rectifier and impress a voltage on the capacitor 69 which is dependent on the current which flows in the armature circuit of the motor. The anode 71d is connected to the point 21a of the voltage divider of which the voltage is relatively positive. The cathode 71e is connected to the cathode 71c which is connected through resistor 69a to the positive terminal of the capacitor 69 and the grid 71f is connected to the anode 71d so that the valve functions as a diode rectifier. The electric valve 72 is connected in parallel with the valve 48 of the second stage amplifier and its grid is connected to the positive terminal of the capacitor 69.

The current limit circuit functions in the following manner: The voltage rectified by the path 71d—71e of the valve 71 charges the capacitor 69 to a voltage which is just insufficient to render the valve 72 conducting. As long as the armature current is less than the predetermined limiting value the voltage rectified by the anodes 71a, 71b and cathode 71c and supplied to the capacitor 69 does not exceed the voltage which is impressed upon the capacitor by the conducting path 71d—71e. However, if the armature current exceeds this predetermined limiting value, the rectified voltage which increases with the armature current increases the voltage on the capacitor 69 and thus the voltage on the grid of valve 72 to a value which renders the valve 72 conducting. Since it is connected in parallel with the second stage valve 48 of the amplifier it shunts current away from that path of the amplifier which is conducting at that time. This results in decreasing the current flowing in the saturating winding of the active saturable reactor and thereby phasing back the grid voltage of the conducting thyratron. The circuit thus prevents the thyratrons from passing excessive values of current. It is to be noted that the conducting path 71d—71e of valve 71 maintains the capacitor 69 charged to a minimum voltage and thus enables the current limit control to function more rapidly than would be possible if it were necessary for it to charge the capacitor 69 from a low initial voltage. Furthermore, the current limit circuit is effective for both polarities of armature current.

With the foregoing understanding of the elements and their organization, the operation of the system will readily be understood from the following detailed description:

It is assumed that the direction of correction switch 30 is in its left-hand closed position.

When the length of material is centered in the correct position laterally in which it is illustrated, the system is balanced and the correcting motor 4 is at standstill. If the length of material becomes displaced to the right of the correct central position, the amount of light falling on the photoelectric cell 9 is increased and the amount of light falling on the photoelectric cell 10 is correspondingly decreased. As a result, the voltage drop across the resistor 32 is increased and the voltage drop across the resistor 37 is correspondingly decreased. This variation of the voltage drops across the resistors 32 and 37 produces corresponding variations of the currents flowing in the right and left conducting paths of the valve 26, i. e. the current in the left-hand conducting path is increased and that in the right-hand conducting path is decreased. Owing to these variations of anode currents, the voltage drops across resistors 28 and 29 are inversely varied with the result that the voltage of the point 40a is decreased and the voltage of the point 42a is increased.

Since the points 40a and 42a are connected to the grids 48c and 48f respectively of the second stage amplifier valve, the current in the right-hand path of the valve 48 is increased and that in the left-hand conducting path is correspondingly decreased. The amount of increase in the current in the right-hand path and the amount of decrease in the left-hand path are proportional to the amount of displacement of the length of material from the correct central position. As a result of the increased current in the right-hand conducting path of valve 48 the voltages at the points 52a and 53a are lowered and similarly the voltages at the points 50a and 51a are correspondingly raised. Thus, the voltage between the points 51a and 52a is decreased with the result that the current flowing in the saturating winding 62a is decreased. On the other hand, the voltage between the points 50a and 53a is increased and consequently the current flowing in the saturating winding 59a is likewise increased.

The decrease in current in the saturating winding 62a results in retarding the phase of the grid voltage of thyratron 65. However, since the phase of this grid voltage was initially retarded almost the maximum amount, only a small further amount of retardation is produced. Since the amount of current conducted by the thyratron 65 in the balanced condition is small, a small retardation of the grid voltage produces only a small decrease in the thyratron current, i. e. reduces it to zero.

The increased current in the saturating winding 59a, however, is fully effective in advancing the phase of the grid voltage of thyratron 64 an amount proportional to the departure of the length of material from its central position and increasing the current conducted by this thyratron a corresponding amount. As a result, a component of pulsating direct current is supplied to the armature of the correction motor 4. Responsively to energization, the motor 4 returns the length of material toward its correct central position at a speed which is modulated in accordance with the amount of departure of the material from the correct position. When the length of material reaches the central position, the system is again balanced and the correction motor is stopped.

If the material is displaced to the left of its correct central position a similar but reverse operation takes place and the correction motor 4 is energized for rotation in the reverse direction to return the length of material to its correct position.

An important advantage of the invention is that the control system in which it is embodied is insensitive to equal simultaneous increases or decreases of the amount of light falling on both cells 9 and 10, and is highly sensitive to any difference in the amounts of light simultaneously falling on both cells. Thus, in the register in the lateral register control system illustrated, equal changes in the width of the strip on opposite sides of the center line do not introduce any correcting action. Unequal changes, on the other hand, initiate an immediate and vigorous centering correction of the strip position.

In order to prevent the system from "hunting," i. e. causing the motor to oscillate the length of material back and forth on opposite sides of the correct central position, an anti-hunting network is provided. This network includes an electric valve 73 having its anode 73a connected through a potentiometer 74 to the point 19a on the voltage divider and having its cathode 73b connected through a resistor 75 to the point 21a on the voltage divider. The valve also has a control grid 73c which is connected to the slider 76a of a potentiometer 76 which is connected in circuit between the resistors 40 and 41 and thus constitutes a portion of the voltage divider for the anode to ground voltage of the left-hand conducting path of the first stage amplifier valve 26. The slider 74a of the potentiometer 74 is connected through capacitors 77 and 78 and the resistor 57 to the point 42a. Thus, the valve 73 responds to and amplifies the deviation signal voltage and applies the amplified voltage to the phase advancing or rate of change anti-hunt circuit including the capacitors 77 and 78 which in turn adds a component voltage which is a function of the rate of change of the signal voltage to the deviation signal voltage which is supplied to the second stage amplifier.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is—

1. A control system comprising in combination, a source of voltage, a pair of electric valves each provided with an anode, a cathode and a control grid, a first impedance connected from one of said anodes to one side of said source, a second impedance connected from the other anode to the same side of said source, a third impedance connected between both said cathodes and the other side of said source, means for supplying inversely varying signal voltages to said grids, a pair of control circuits each connected from a point of relatively high voltage of a different one of said first and second impedances to a point of lower voltage of the other, and an electrical translating device controlled in response to the difference in energization of said control circuits.

2. A control system comprising in combination, a source of voltage, a pair of electric valves each provided with an anode, a cathode, and a control grid, means for supplying inversely varying signal voltages to said grids, a resistor connected between both said cathodes and one side of said source, a bridge network including individual resistors connected between each of said anodes and the other side of said source, a pair of control circuits each connected from a point of relatively high voltage of a different one of said individual resistors to a point of lower voltage of the other, and an electrical translating device controlled in response to the difference in energizations of said control circuits resulting from variations of said variable signal voltage.

3. A control system comprising in combination a source of voltage, a pair of electric valves each provided with an anode, a cathode and a control grid, means for supplying inversely varying signal voltages to said control grids, a common resistor connected between both cathodes and one side of said source, a bridge network comprising individual impedances connected between each of said anodes and the other side of said source and a pair of control circuits each connected from a point of relatively high voltage of a different one of said individual impedances to a point of lower voltage of the other of said impedances, a rectifier connected in each of said control circuits, and an electrical translating device controlled in response to the difference in energization of said control circuits resulting from variation of said signal voltages.

4. A control system comprising in combination a source of voltage, a pair of electric valves each provided with an anode, a cathode and a control grid, means for supplying inversely varying signal voltages to said control grids, a common resistor connected between both cathodes and one side of said source, a bridge network comprising individual impedances connected between each of said anodes and the other side of said source and a pair of control circuits each connected from a point of relatively high voltage of a different one of said individual impedances to a point of lower voltage of the other of said impedances, a pair of saturable reactors each having a saturating winding energized by a different one of said control circuits, and an electrical translating device controlled in response to the difference in energizations of said saturable reactors.

5. A control system comprising in combination a source of voltage, a pair of electric valves each provided with an anode, a cathode and a control grid, means for supplying inversely varying signal voltages to said control grids, a common resistor connected between both cathodes and one side of said source, a bridge network comprising individual impedances connected between each of said anodes and the other side of said source and a pair of control circuits each connected from a point of relatively high voltage of a different one of said individual impedances to a point of lower voltage of the other of said impedances, a pair of saturable reactors each having a saturating winding connected to be energized by a different one of said control circuits, an electrical translating device, and means comprising electric valves responsive to the difference in energizations of said saturable reactors for controlling said translating device.

6. A control system comprising in combination a source of voltage, a pair of electric valves each provided with an anode, a cathode and a control grid, means for supplying inversely varying signal voltages to said control grids, a common resistor connected between both cathodes and one side of said source, a bridge network comprising individual impedances connected between each of said anodes and the other side of said source and a pair of control circuits each connected from a point of relatively high voltage of a different one of said individual impedances to a point of lower voltage of the other of said impedances, a pair of saturable reactors each having a saturating winding connected to be energized by a different one of said control circuits and a reactance winding, a pair of phase shifting circuits each comprising a resistor and a corresponding one of said reactance windings, an electrical translating device, and a pair of electric valves each controlled by one of said phase shifting circuits for controlling said translating device.

7. A control system comprising in combination a source of voltage, a pair of electric valves each provided with an anode, a cathode and a control grid, means for supplying inversely varying signal voltages to said control grids, a common resistor connected between both cathodes and one side of said source, a bridge network comprising individual impedances connected between each of said anodes and the other side of said source and a pair of control circuits each connected from a point of relatively high voltage of a different one of said individual impedances to a point of lower voltage of the other of said impedances, an electrical translating device connected to have a terminal electrical characteristic controlled in response to the difference in energizations of said control circuits, and means for limiting said terminal characteristic to a predetermined value comprising means for producing a signal voltage corresponding to the magnitude of said characteristic, a capacitor connected to be charged in response to said signal voltage, and means responsive to the voltage across said capacitor for controlling the conductivities of said electric valves to limit said characteristic.

8. A control system comprising in combination a source of voltage, a pair of electric valves each provided with an anode, a cathode and a control grid, means for supplying inversely varying signal voltages to said control grids, a common resistor connected between both cathodes and one side of said source, a bridge network comprising individual impedances connected between each of said anodes and the other side of said source and a pair of control circuits each connected from a point of relatively high voltage of a different one of said individual impedances to a point of lower voltage of the other of said impedances, an electrical translating device connected to have a terminal electrical characteristic controlled in response to the difference in energizations of said control circuits, and means for limiting said terminal characteristic to a predetermined value comprising means for producing a signal voltage corresponding to the magnitude of said characteristic, a capacitor connected to be charged in response to said signal voltage, and a control electric valve connected to be responsive to the voltage across said capacitor for controlling the conductivities of said pair of electric valves to limit said characteristic.

9. A control system comprising in combination a source of voltage, a pair of electric valves each provided with an anode, a cathode and a control grid, means for supplying inversely varying signal voltages to said control grids, a common resistor connected between both cathodes and one side of said source, a bridge network comprising individual impedances connected between each of said anodes and the other side of said source and a pair of control circuits each connected from a point of relatively high voltage of a different one of said individual impedances to a point of lower voltage of the other of said impedances, an electrical translating device connected to have a terminal electrical characteristic controlled in response to the difference in energizations of said control circuits, and means for limiting said terminal characteristic to a predetermined value comprising means for producing a signal voltage corresponding to the magnitude of said characteristic, a capacitor connected to be charged in response to said signal voltage, and a control electric valve having an anode connected to one side of said source, a cathode connected to a point on said common resistor and its grid connected to be responsive to the voltage across said capacitor to control the conductivities of said pair of electric valves.

10. A control system comprising in combination a source of voltage, a pair of electric valves each provided with an anode, a cathode and a control grid, means for supplying inversely varying signal voltages to said control grids, a common resistor connected between both cathodes and one side of said source, a bridge network comprising individual impedances connected between each of said anodes and the other side of said source and a pair of control circuits each connected from a point of relatively high voltage of a different one of said individual impedances to a point of lower voltage of the other of said impedances, an electric translating device, means comprising electric valve means controlled in response to the difference in energizations of said control circuits for supplying a current to said translating device, and means for limiting said current to a predetermined value comprising means responsive to said current for producing an alternating signal voltage means for rectifying said alternating voltage, a capacitor connected to be charged by said rectified voltage and a control electric valve responsive to the voltage across said capacitor for controlling said pair of electric valves.

11. A control system comprising in combination a source of voltage, a pair of electric valves each provided with an anode, a cathode and a control grid, means for supplying inversely varying signal voltages to said control grids, a common resistor connected between both cathodes and one side of said source, a bridge network comprising individual impedances connected between each of said anodes and the other side of said source and a pair of control circuits each connected from a point of relatively high voltage of a different one of said individual impedances to a point of lower voltage of the other of said impedances, an electrical translating device connected to have a terminal electrical characteristic controlled in response to the difference in energizations of said control circuits, and means for limiting said terminal characteristic to a predetermined value comprising means for producing a signal voltage corresponding to the magnitude of said characteristic, a capacitor connected to be charged in response to said signal voltage, means responsive to a critical value of the voltage across said capacitor for controlling the conductivities of said electric valves to limit said characteristic, and means for continuously charging said capacitor to a value slightly less than said critical value.

LEROY U. C. KELLING.

REFERENCES CITED

The following references are of record in the file of this patent:

UNITED STATES PATENTS

| Number | Name | Date |
| --- | --- | --- |
| 2,175,017 | Cockrell | Oct. 3, 1939 |
| 2,356,567 | Cockrell | Aug. 22, 1944 |
| 2,410,703 | Berkoff et al. | Nov. 5, 1946 |
| 2,430,310 | Stratton | Nov. 4, 1947 |